United States Patent [19]

Jabsen

[11] 4,163,690
[45] Aug. 7, 1979

[54] NUCLEAR REACTOR FUEL ASSEMBLY SPACER GRID

[75] Inventor: Felix S. Jabsen, Lynchburg, Va.

[73] Assignee: The Babcock & Wilcox Company, New York, N.Y.

[21] Appl. No.: 757,723

[22] Filed: Jan. 7, 1977

[51] Int. Cl.² .................................................. G21C 3/30
[52] U.S. Cl. ........................................ 176/78; 176/76
[58] Field of Search .................................... 176/76, 78

[56] References Cited

U.S. PATENT DOCUMENTS

| | | | |
|---|---|---|---|
| 3,255,090 | 6/1966 | Leirvik | 176/78 |
| 3,442,763 | 5/1969 | Chetter | 176/78 |
| 3,665,586 | 5/1972 | Jabsen | 176/78 |
| 3,813,288 | 5/1974 | Leaver | 176/78 |
| 3,824,153 | 7/1974 | Leaver | 176/78 |
| 3,833,471 | 11/1977 | Chetter | 176/78 |
| 3,890,196 | 6/1975 | Chetter | 176/78 |
| 3,933,583 | 1/1976 | Jabsen | 176/78 |

Primary Examiner—Samuel W. Engle
Assistant Examiner—Donald P. Walsh
Attorney, Agent, or Firm—Joseph M. Maguire; Angelo Notaro

[57] ABSTRACT

A spacer grid for a nuclear fuel assembly is comprised of a lattice of grid plates forming multiple cells that are penetrated by fuel elements. Resilient protrusions and rigid protrusions projecting into the cells from the plates bear against the fuel element to effect proper support and spacing. Pairs of intersecting grid plates, disposed in a longitudinally spaced relationship, cooperate with other plates to form a lattice wherein each cell contains adjacent panels having resilient protrusions arranged opposite adjacent panels having rigid protrusions. The peripheral band bounding the lattice is provided solely with rigid protrusions projecting into the peripheral cells.

8 Claims, 12 Drawing Figures

FIG. 1

FIG. 12

NUCLEAR REACTOR FUEL ASSEMBLY SPACER GRID

BACKGROUND OF THE INVENTION

1. Field of the Invention

This invention relates to nuclear reactor fuel element assemblies and, in particular, to a fuel element assembly which utilizes a grid plate arrangement for locating and supporting fuel elements in the form of pins, rods or the like.

2. Summary of the Prior Art

In heterogeneous nuclear reactors, nuclear fuel is separated from the moderator and arranged in discrete bodies known as fuel elements. Fuel elements typically utilized in heterogeneous reactors consist of thin-walled, elongated, slender tubes or rods which clad the nuclear fuel contained within the element in order to prevent corrosion of the fuel and the release of fission products into the coolant, and are known in the art as "fuel pins" or "fuel rods". Aluminum or its alloys, stainless steel and zirconium alloys are common cladding materials. Such fuel pins are generally arranged in a carefully designed pattern to form an array which comprises the reactor core that provides the concentration of fissionable material needed to sustain a continuous sequence of fission reactions. In a heterogeneous reactor the fuel pins in the core become depleted at different rates, those in the center usually being subjected to a higher neutron flux and thus becoming depleted before those near the outside of the core where a lower neutron flux prevails. Consequently, all of the fuel elements are not normally replaced at one time but rather in stages. Furthermore, at each refueling, partially depleted elements may be relocated in order to optimize core performance and extend the time between refueling outages. It is advantageous, therefore, to group the fuel elements into movable units, known as fuel assemblies, which may contain hundreds of fuel pins. A fuel assembly is typically arranged in juxtaposition with similar assemblies in the core of a pressurized water reactor. In a boiling water reactor, each fuel assembly is typically encased in a square flow channel, commonly called a "can", which is juxtaposed with similar cans occupying the core. Movement of the fuel elements as fuel assemblies during charging and discharging of a reactor core expedites core reloading operations, thereby increasing the overall availability of the reactor and generally enhancing the economics of nuclear reactor use for functions such as power generation.

The design of a fuel assembly requires careful analysis to assure the maintenance of the assembly's geometrical integrity during all phases of reactor operation. Heat generated within the fuel pin is often removed by a fluid coolant which flows through the reactor core generally in a direction which is parallel to the longitudinal axes of the fuel pins. The fluid velocity and flow rate may be very high in order to remove the large quantity of heat generated. The surface area of the individual fuel pins, therefore, must be as fully exposed to the flowing fluid as possible in order to promote heat transfer to the coolant and to prevent the development of hot spots on the fuel element due to poor coolant flow conditions. Moreover, the elongated slender fuel pins may be subjected to harmful vibrations induced by the coolant flow or other sources.

Thus, it is desirable to arrange fuel elements in an assembly wherein the elements are spaced in a geometry conducive to proper reactor physics while satisfying a number of conflicting needs, viz., the need to minimize structural restraints in order to promote heat transfer from the fuel pins to the coolant, the need to provide structural support to a large number of fuel pins subjected to thermal, hydraulic and vibratory forces and the like, the need to minimize hydraulic pressure losses, and the need to minimize the presence of material capable of parasitic absorption of neutrons. Some fuel assemblies of the prior art have utilized a grid of plates to space and support the fuel pins. Usually, these grids comprise a cellular structure, commonly characterized as the egg crate design, that is formed through the mutually perpendicular intersections of a group of interlocking metal plates. Bosses, dimples, bowed members and the like protrude from the surface of the portions of these interlocking plates that form the individual cell walls. A fuel pin is inserted into each cell formed in the grid structure. The protrusions engage the outer surface of the fuel pin within a particular cell both restraining and locating the pin.

Two types of protrusions are commonly employed. One type of grid plate protrusion is very resilient being essentially spring mounted. The resilient character of these protrusions permits their deflection so that the fuel pins can be inserted into the grid structure with relative ease. Upon removal of the deflecting means the resilient protrusion springs back into position in the cell thus receiving the fuel pin. The other type of grid plate protrusion is a very stiff, rigid member which essentially eliminates relative movement between the fuel pins and the protrusions.

Problems have been experienced in grid designs in which either resilient or rigid protrusions alone have been used. Construction of a grid with cells containing a totality of resilient protrusions is difficult. Use of a two-tier arrangement of grids to overcome such difficulties results in the introduction of additional material capable of parasitic absorption of neutrons while increasing costs and complicating fabrication of the fuel assembly. During reactor operation the flexibility of the resilient protrusions permits relative movement at the protrusion to fuel pin contact point. This motion produces an undesirable wearing or "fretting" of the pin that weakens the cladding and can cause its failure. Use of a totality of the rigid type of protrusions, on the other hand, leads to other difficulties. For example, it is difficult to insert a fuel pin through a cell containing a totality of the unyielding rigid protrusions without galling, abrasion, gouging or like damage to the cladding.

A grid plate design which utilizes a combination of resilient protrusions and rigid protrusions within a cell can overcome these problems. Deflection of the resilient protrusions allows fuel pin insertion without damage. After removal of the deflecting means, the resilient protrusions spring into position causing the fuel pins to be secured at the contact points of both the resilient and rigid protrusions. It is evident that in each cell a resilient protrusion should be located on the plate wall opposite a plate having a rigid protrusion to facilitate fuel pin insertion and removal and to more positively secure the pins during reactor operation. However, it soon becomes apparent that the peripheral band surrounding the fuel assembly will therefore contain resilient and rigid protrusions, complicating the construction of the band. In addition, locating the resilient protrusions on the peripheral band necessarily results in weakening of the band. This is highly undesirable since the peripheral bands of juxtaposed fuel assemblies abut and lend lateral support to each other, and, in addition to retaining their structural integrity without damage during normal conditions, these bands must withstand impact forces generated during abnormal occurrences, for example, earthquakes. Moreover, when a reactor utilizing a grid assembly described above it utilized to power a mobile unit, such as an ice breaker ship, external vibrations may be transmitted thereto causing additional impact between the peripheral bands or between the band and its sheathing can. Hence, it is highly desirable to develop a fuel element grid plate assembly which does not utilize resilient protrusions in its peripheral band while retaining the advantages inherent in the combination resilient and rigid protrusion cells.

Furthermore, such a fuel element support assembly would offer further advantages if it could be adapted to use in a reactor that utilizes "cans" to encase each fuel assembly.

SUMMARY OF THE INVENTION

According to the present invention, in a fuel assembly a spacer grid of the type described above, two longitudinally paired grid plates, constructed differently in accordance with the preferred embodiments discussed below, intersect with a similar set of paired plates at a generally central point in the grid plate lattice. Each of the paired grid plates is formed with resilient protrusions extending into the cells on either side of these paired plates. The remaining grid plates in the grid structure have resilient protrusions on one face and rigid protrusions on the face on the opposite side of the plate. These grid plates are organized in two groups, each of the groups being parallel with a respective paired plate combination; the individual grid plates in each group, moreover, being spaced from each other and generally intersecting perpendicularly with the grid plates in the other group, in order to form a cellular structure. The rigid protrusions in the plates in each group are orientated toward the paired plates with which each respective grid plate group is parallel. In this way, each of the cells is bounded by two adjacent plate surfaces from which a set of rigid protrusions project into the cell and two adjacent plate surfaces from which a set of resilient protrusions project into that cell, none of the protrusions in either of these two sets being on oppositely disposed surfaces. In these circumstances, the grid can be arranged so that the peripheral band contains only rigid protrusions.

In one embodiment, the peripheral band is constructed so that a spring-like member is disposed on the surface farther away from the center of the assembly. The spring-like member assures spring contact force between juxtaposed fuel element assembly spacer grid peripheral bands in a "canless" type reactor core arrangement and between the peripheral band and the inner wall of the can of a "can" type reactor core resulting in a fuel assembly having greater stability under normal and abnormal operating conditions.

Other combinations of plates to provide the desired orientation of sets of rigid and resilient protrusions in each cell may be used when the use of resilient protrusions in the peripheral band is desired for a particular application.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
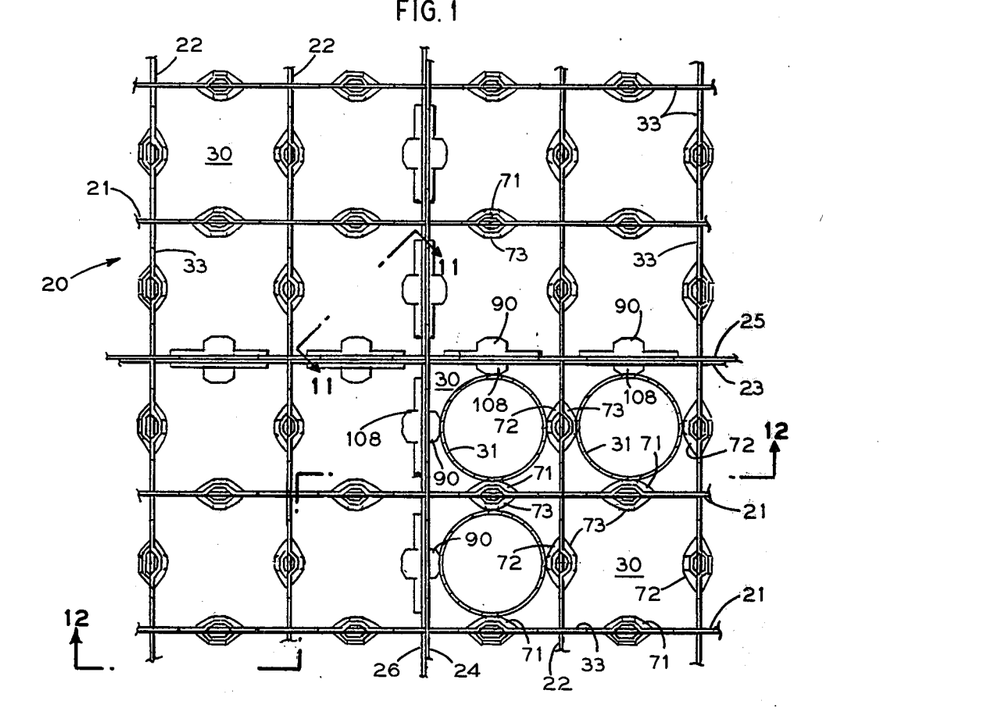
FIG. 1 is a plan view of the central part of a representative portion of a fuel element assembly with a number of cylindrical fuel pins added.

FIG. 1 shows a generally central portion of a fuel assembly spacer grid 20 composed of a plurality of grid plates 21, 22, 23, 24, 25, 26 intersecting and interlocking, as described hereinafter, to form a multiplicity of cells 30 of substantially open cross section. A plurality of nuclear fuel pins 31, disposed through the cells with their longitudinal axes 32 parallel, the laterally spaced and supported by the grid plates. The construction of the individual grid plates 21, 22, 23, 24, 25, 26 includes three distinct designs.

Figure 2:
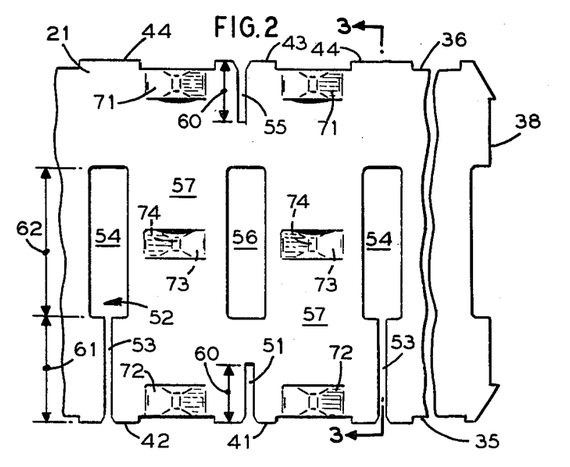
FIG. 2 is a side elevation of a representative portion of a grid plate according to the invention.
Figure 3:
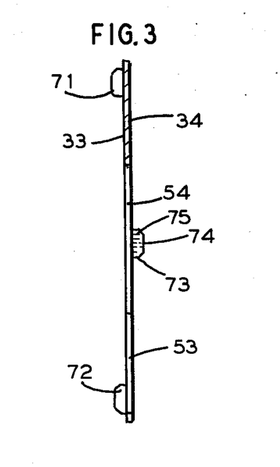
FIG. 3 is a side view of the plate shown in FIG. 2 taken along the lines 3—3.

The first design, representative of identical grid plates 21, 22, is best shown in FIGS. 2 and 3. The grid plate 21, 22 of which only 21 is described in detail for illustrative purposes, is a substantially flat rectangular sheet of material which has mutually opposing faces 33, 34, lengthwise edges 35, 36 and widthwise edges 37, 38 (only widthwise edge 38 being shown in FIG. 2). The lengthwise edges 35, 36 are orientated transversely with respect to the longitudinal axes of the fuel pins and the widthwise edges 37, 38 are oriented in parallel with the longitudinal axes of the fuel pins. The edges 35, 36 span the breadth of the fuel assembly spacer grid.

A ridge 41 (FIG. 2) is located in the edge 35 of each grid plate 21. A transverse slot 51, extending a distance 60, is cut out of the grid plate 21 through the center of ridge 41. The slot 51 is chamfered at edge 35. Like-dimensioned ridges 42 are formed at equidistantly spaced intervals along the edge 35 on either side of ridge 41. A plurality of paddle shaped slots 52, each transversely intersecting a ridge 42 through edge 35, is cut out of the grid plate 21. Each paddle shaped slot 52 includes a narrow slot 53, chamfered at the edge 35, which extends a distance 61 to a broader generally rectangular cutout 54. The rectangular shaped cutout extends an additional distance 62 away from edge 35 and is centrally disposed in longitudinal axial alignment with slot 53. A ridge 43 is formed in edge 36 longitudinally opposite ridge 41 in edge 35. A transverse slot 55, chamfered at edge 36, intersects ridge 43 and extends a distance 60 from edge 36. A plurality of like-dimensioned ridges 44 are equidistantly spaced at intervals along edge 36 on either side of the ridge 43. The ridges 44 of edge 36 are disposed longitudinally opposite ridges 42 of edge 35. A single rectangular cutout 56, having dimensions corresponding to those of rectangular cutout 54, is disposed in the center of the plate 21. Cutout 56 is equidistantly spaced between and longitudinally aligned with slots 51 and 55, and laterally aligned with cutouts 54. A plurality of panels 57 is defined by the areas between adjacent cutouts, 54, 56.

The plate 21 is also provided with a plurality of protrusions 71, 72 raised from face 33 and protrusions 73 raised from face 34 at spaced intervals through its length and breadth. Protrusions 71 and 72 project from the portion of the face 33 generally between the ridges of the edges 35 and 36, respectively, in one direction; protrusions 73 project the center portion of the face 34, spaced longitudinally between the edges 35, 36 and laterally between the rectangular cutouts, in the opposite direction. Each protrusion of plate 21, is longitudinally aligned with the protrusions having unlike reference numerals and laterally aligned with the protrusions having like reference numerals. A peak 74, having a minimal surface area, is formed at the apex of the protrusion 73. Each raised face or surface of the protrusion 73 leading to the apex 74 is provided with an aperture 75. The protrusions 71, 72 have a configuration that is identical to the one described in connection with the protrusion 73.

Figure 4:
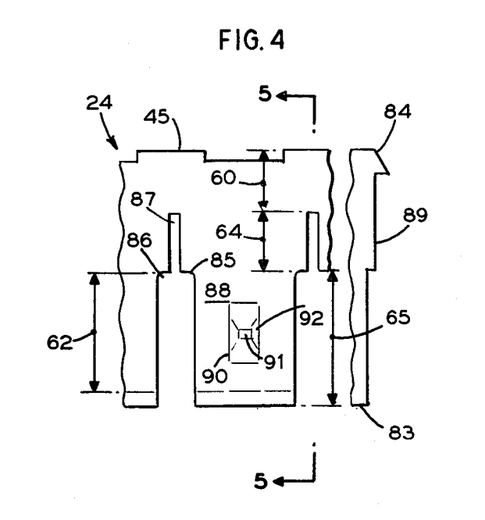
FIG. 4 is a side elevation of a representative portion of a grid plate used in a typical paired plate arrangement according to the invention.
Figure 5:
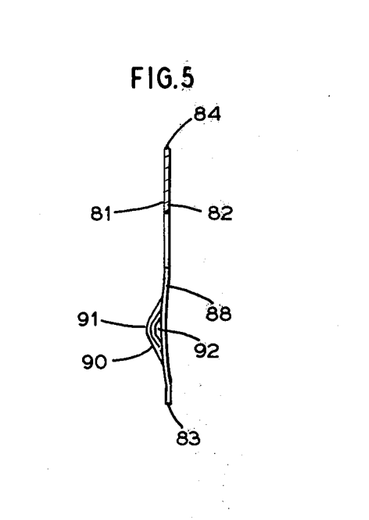
FIG. 5 is a sectional view of the grid plate shown in FIG. 4 taken along the line 5—5.

A second grid plate design, representative of the identical grid plates 24, 25, is shown in FIGS. 4 and 5. The grid plates 24, 25 of which only 24 is described in detail for illustrative purposes, is a generally flat rectangular sheet of material which has mutually opposing faces 81, 82, lengthwise edges 83, 84 and widthwise edges of which only the widthwise edge 89 is shown in the drawing. The lengthwise edges 83, 84 are orientated transversely with respect to the longitudinal axes 32 of the fuel pins 31, and the widthwise edge 89, save for small sloping portions, is orientated in parallel with the longitudinal axes 32 of the fuel pins. Edge 83 is interrupted at equally spaced intervals by a plurality of like-dimensioned paddle shaped slots 85. Each paddle shaped slot 85 includes a broader generally rectangular slot 86 extending transversely from edge 83 a distance 65 and connecting with a narrower slot 87. The narrower slot 87 extends a distance 64 further into the plate 24 and is in longitudinal alignment with slot 86. Like-dimensioned ridges 45 are disposed at equally spaced intervals, along edge 84 generally aligned opposite the paddle shaped slots 85. Portions of the grid plate 24 located between the paddle shaped slots 85 define a plurality of similar panels 88, only one of which is shown, cantilevered away from edge 84. A substantial portion of each cantilevered panel 88 that is spaced between slots 86 is bowed transversely out of alignment with the planes of the faces 81, 82 over a distance 62 terminating in a planar lip at edge 83, the lip being in the same plane as that established by the faces 81, 82. The bow projects in a direction such that the arc in face 81 is defined by a radius of curvature larger than that of the bowed portion face 82. A protrusion 90 is raised from the face 81 on each panel 88 peaking at a minimal surface 91 at the apex of the protrusion. An aperture 92 is formed in two of the surfaces leading to the peak 91 of protrusion 90.

Figures 6, 7:
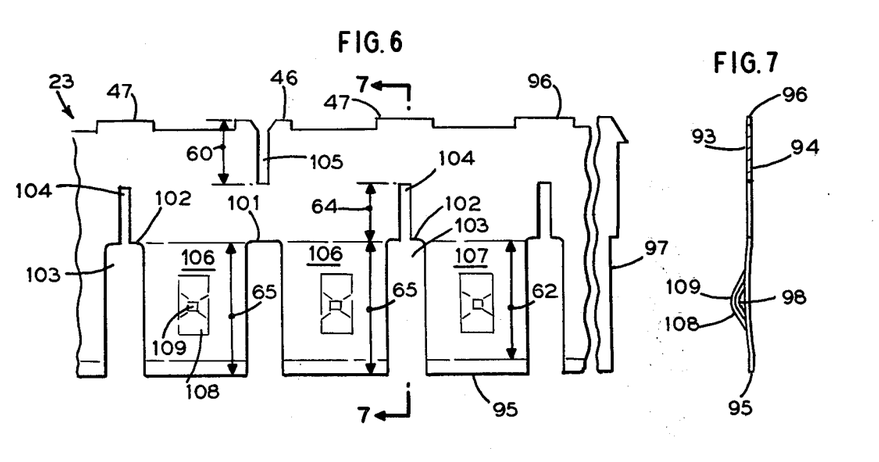
FIG. 6 is a side view of a representative portion of still another grid plate that is used in a typical paired plate arrangement according to the invention.
FIG. 7 is a sectional view of the grid plate shown in FIG. 6 taken along the line 7—7.

The third grid plate design, representative of the identical grid plates 23, 26, is shown in FIGS. 6 and 7. The grid plates 23 or 26 of which only 23 is described in detail for illustrative purposes, is a generally flat rectangular sheet of material which has mutually opposing faces 93, 94, lengthwise edges 95, 96 and widthwise edges (only the edge 97 being shown in FIG. 6). The widthwise edge 97 is identical to widthwise edge 89 of plate 24. The lengthwise edges 95, 96 are orientated transversely with respect to the longitudinal axes of the fuel pins, and the widthwise edge 97 is orientated in parallel with the longitudinal axes 32 of the fuel pins, save for a small sloping portion at the corner between edges 96 and 97. A rectangular slot 101 transversely intersects the edge 95 for a depth 65. Like-dimensioned paddle shaped slots 102 are formed at equidistantly spaced intervals along the edge 95 on either side of slot 101. Each paddle shaped slot 102 includes a broader generally rectangular slot 103 extending from edge 95 connecting with a narrower slot 104. The dimensions of slot 103 correspond to that of slot 101. The narrower slot 104 extends into the plate 23 a further distance 64. A ridge 46 is located in edge 96 of grid plate 23. A transverse slot 105, extending a distance 60 into the plate 23, is cut through the center of ridge 46. The slot 105 is chamfered at edge 96. A plurality of like-dimensioned ridges 47 is formed at equidistantly spaced intervals along edge 96 on either side of ridge 46, and generally in longitudinal alignment with paddle shaped slots 102. The portions of the grid plate 23 located between slot 101 and adjacent slots 103 define two cantilevered panels 106. The portions of the grid plate located between adjacent slots 103 define a plurality of panels 107, only one of which is shown (FIG. 6). Panels 106 are cantilevered away from edge 96 and are bowed transversely out of alignment with the plane of the faces 93, 94 for a distance 62 terminating in a planar lip that is in longitudinal alignment with the planar faces 93, 94 leading to edge 95. The bow projects in a direction such that the arc in face 93 is defined by a radius of curvature larger than that of the bowed portion of the opposing face 94. Panels 107 also are cantilevered away from edge 96. Panels 107 are bowed out of alignment with the plane of the faces 93, 94 over a distance 62 commencing at the inner recess of slot 103, over a distance 62, and terminating in a planar lip that is in longitudinal alignment with the planar faces 93, 94 leading to edge 95. A protrusion 108 is raised from the face 93 of each panel 106, 107 to a peak 109 at the apex of the protrusion. An aperture 98 is formed in two of the surfaces leading to the peak 109.

Figure 8:
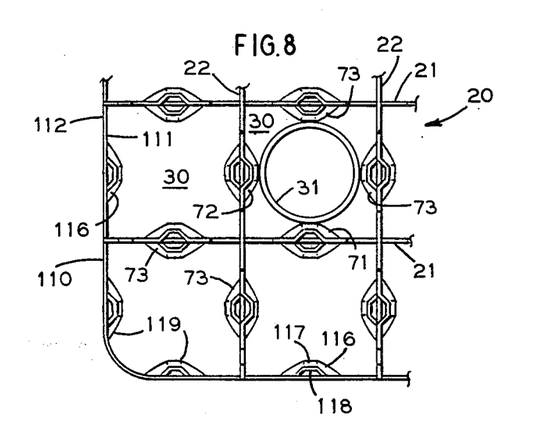
FIG. 8 is a plan view of an outer corner of a portion of the fuel element spacer plate assembly.
Figure 9:
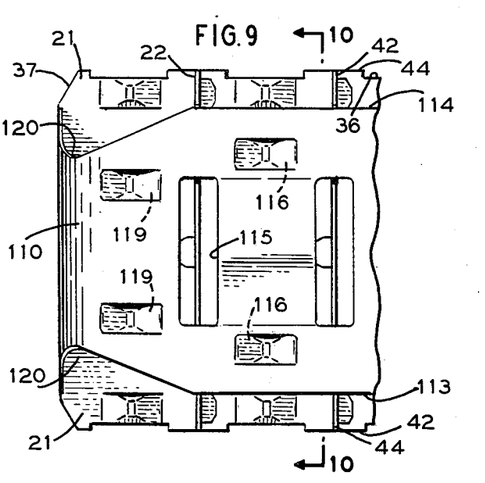
FIG. 9 is a front elevation view of the corner portion of the fuel element assembly shown in FIG. 8.
Figure 10:
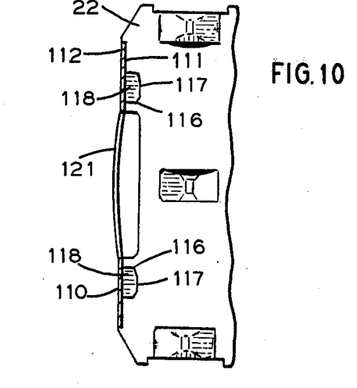
FIG. 10 is a sectional view of a portion of the illustration in FIG. 9 taken along lines 10—10.

FIG. 8 illustrates a portion of a corner section of spacer grid 20 including a peripheral band 110 which encircles the grid structure in communication with the widthwise edges of the associated grid plates. As can be seen in FIGS. 9 and 10, the peripheral band 110 is a generally flat sheet of material having a mutually opposing inner face 111 and outer face 112, and lengthwise edges 113, 114. A plurality of like-dimensioned rectangular cutouts 115, having their longer edges oriented in parallel with the longitudinal axes 32 of the fuel pins, are centrally disposed between the edges 113, 114 at equidistantly spaced lateral intervals. The peripheral band has a plurality of protrusions 116, 119 raised from the inner face 111 which project into the peripheral cells. A peak 117, having a minimal surface area, is formed at the apex of the protrusion 116. Apertures 118 (FIGS. 8, 10) are formed in each of the raised surfaces of protrusions 116 leading to peak 117 (FIG. 10).

As shown in FIG. 9, the band 110 is not as wide as the maximum width of the plates 21, 22. The sloping portion of the widthwise edge 37 thus forms a transition section that matches the greater width of the grid plate 21 to the lesser width of the band 110. The widthwise edges of the remaining plates are similarly sloped (not shown), as described hereinbelow, to form a transition to the narrower peripheral band.

The band 110 forms right angle corners 120 which are bevelled, as shown in FIG. 9, to provide a generally vee shaped cut in the lengthwise edges 113, 114. The protrusions 119 which laterally border each corner are spaced longitudinally closer to each other than the protrusions 116 which do not border the corners of the peripheral band. The protrusions 119 have a configuration that is similar to the one described above in connection with protrusion 116. In a preferred embodiment of the invention, a spring like bowed member 121 (FIG. 10) protrudes from face 112 of the band 110.

Figure 11:
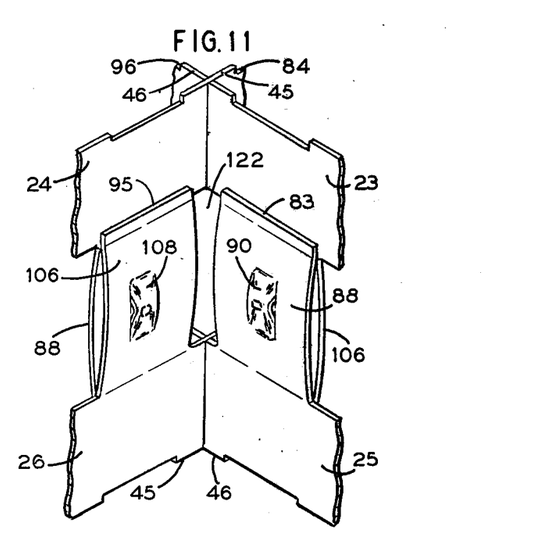
FIG. 11 is a perspective section taken along line 11—11 of FIG. 1.

A fuel element spacer grid plate lattice is arranged, in accordance with a preferred embodiment of the invention and, as is best shown in FIGS. 1 and 11, with a first pair of grid plates 23, 25 (FIG. 11) disposed in longitudinally opposite and inverted relation with each other. A second pair of dissimilar grid plates 24, 26, are similarly arranged in a spaced longitudinal orientation. The lips between the end of the arcuate cantilever and the edges 83, 95 generally overlap a portion of a face of the longitudinally opposite grid plate.

As is shown in FIG. 11, grid plate 23 is arranged to perpendicularly intersect and interlock with plate 24 by aligning a paddle shaped cutout 85 (FIG. 4) of plate 24 superjacent to the slot 105 (FIG. 6) of grid plate 23, and by meshing these slots 85, 105 until (as is shown in FIG. 11) the plates interlock so that edge 84 at ridge 45 of plate 24 attains a flush crisscross alignment with the ridge 46 of plate 23 due to the fact that the distance 60 of the slot 105 of plate 23 coincides with the distance between the ridge 45 and slot 87 of plate 24.

It has been noted, hereinbefore, that plate 26 is identical to plate 23, and that plate 25 is identical to plate 24. In order to follow the description of the cooperation of the plates 24 and 25 with each other and the remaining plates, it should be understood that the detailed reference numerals of plates 23 and 24 are applicable to plates 26 and 25, respectively. It can be seen that the distance 60 of the cut of slot 105 of plate 26 (FIG. 6) coincides with the distance 60 between the edge 84 at ridge 45 of plate 25 (FIG. 4) and the closest portion of the longitudinally aligned slot 87 of plate 25. Therefore, grid plate 26 is arranged to intersect and interlock with grid plate 25 by aligning slot 105 (FIG. 6) perpendicularly superjacent to a paddle shaped cutout 85 (FIG. 4) of plate 25, and by engaging the slot 105 and cutout 85 until (as is shown in FIG. 11) the plates interlock with ridges 46 of plate 25 in flush crisscross alignment with ridge 45 of plate 26.

Although dissimilar plates are paired in the described embodiment, it should be noted that this is not essential to the practice of the invention. Thus, the plates 23, 26 could be paired together to intersect and interlock with a paired plate 24, 25.

It can be seen (FIGS. 1, 11) that the paired plates are arranged in perpendicular longitudinal planes, within the lattice, to intersect along a single longitudinal line in the spacer grid.

Plates 21 are grouped in parallel arrangement with the paired plates 23, 25 (FIG. 1). Moreover, the plates 21 are disposed on either side of the paired plates with faces 33 of plates 21 turned in the direction of the paired plates 23, 25. Plates 22 are orientated in parallel with paired plates 24, 26. Plates 22 are inverted and in perpendicular relationship with plates 21. The plates 22 are grouped in parallel arrangement on either side of the paired plates so that the faces 33 of plates 22 are directed toward the paired plates 24, 26. Plates 21 and 22 are assembled in a perpendicularly interlocking and intersecting relation by orienting them at superjacent right angles such that the inverted paddle shaped slots 52 are aligned, and by drawing them together. Upon interlocking the plates 21, 22, it can be seen (FIG. 9) that edge of the ridge 42 of one plate is flush with the edge of the ridge 44 of the other.

Plate 24 perpendicularly intersects each of the plates 21 at their respective individual slots 55 (FIG. 2), by superjacently aligning slots 85 (FIG. 4) of the plates 24 with slots 55 of the plates 21 and drawing them together until the plates interlock. Upon interlocking, ridges 45 of plate 24 will be in flush crisscrossed alignment with ridges 43 of plates 21. The plate 26, an illustrative embodiment of which is shown by the plate 23 in FIG. 6, which is longitudinally paired with plate 24, will similarly be drawn together with plates 21 so that ridges 47 of plate 26 will be crisscrossed and flush with ridges 42 of plates 21.

Plate 23 (FIG. 6) perpendicularly intersects plates 22, an illustrative embodiment of which is shown by the plate 21 in FIG. 2, at slot 51 by superjacently aligning slots 102 of the plates 23 with slots 51 of the plates 22 and drawing these together until the plates interlock. Upon interlocking, ridges 47 (FIG. 6) of plate 23 will be crisscrossed and flush with ridges 41 of plates 22 (FIG. 2). Paired plate 25, an illustrative embodiment of which is shown by the plate 24 is FIG. 4, is similarly interlocked with the opposing edge 36 of each plate 22 by superjacently aligning paddle shaped slots 85 (FIG. 4) of the plates 25 with slots 55 (FIG. 2) of the plate 22 and drawing them together until they interlock, with ridges 45 of plate 25 crisscrossed and flush with ridges 43 of plates 22.

The grid plates are made from somewhat resilient material compatible with nuclear reactor operating conditions and preferably having a low neutron absorption cross section. The fuel pins are made of a nuclear fuel material encapsulated in a thin-walled, slender, elongated sheath of a metal cladding material which has a coefficient of expansion that is substantially the same as that of the material of which the grid plates are constructed to essentially eliminate differential thermal expansion between the grid plates.

Chamfering of the slots at the edges of the various plates facilitates the interlocking, described hereinafter, of the plates.

The widthwise edges of the grid plates 21, 22, 23, 24, 25, 26 are held in rigid communication with the face 111 of the band 110 by welding, brazing (not shown) or other well known means.

The crisscrossed ridges, described hereinbefore, serve as surfaces for the deposition of material to rigidly join the perpendicularly interlocked plates into position by welding, brazing or other means.

The apertures in the protrusions allow reactor coolant (not shown) to flow about the protrusions with minimum hydraulic pressure loss and flow stagnation.

The panels 57 (FIG. 2) formed between the cutouts 54, 56 of the plates 21, 22 can be mechanically flexed within the elastic range of the plate material by external means. The cantilevered panels 88, 106, 107 (FIGS. 6, 11) of grid plates 23, 24, 25, 26 may also be flexed by external means as described hereinafter. The adjacent cutouts, in conjunction with the rigid ridge communication described above, cause the panels 57, 88, 106, 107 to be relatively more flexible than the remainder of the plates.

Protrusions 73 on plates 21, 22 are on panels 57 (FIG. 2). As stated, panels 57 may be fixed, within the elastic range of the plate material, from their equilibrium plane by external means but have sufficient resilience to return to that plane after the deflecting means are removed. Protrusions 71 and 72, are located near edges 36 and 35 respectively. Since the ridges of intersecting plates are rigidly joined together, the portions of the plates upon which these protrusions 71, 72 are located is relatively inflexible. Hence, protrusions 73 may be characterized as resilient, since these are movable with panel 57, and protrusions 71, 72 may be characterized as rigid since these are relatively fixed in position.

As shown in FIG. 11, the cantilevered panels 88, 106 arc from the base of their plates until their planar surfaces are in transverse contact with the base of the plate longitudinally opposed thereto. Each of the cantilevered panels may be flexed, within the elastic range of the plate material, through the application of an external force, and has sufficient resilience to return to its equilibrium position after the means for applying the external force are removed. Hence, the protrusions 90, 108 may be characterized as resilient due to the resilience of the members on which they are located.

Protrusions 116, 119 on band 110 (FIG. 9) are characterized as rigid as the portions of the band upon which these are located are relatively inflexible.

Arrangement of the paired plates 23, 25, and individual paired plates 24, 26, with the plates in each pair in longitudinally spaced alignment and inverted with respect to each other, results in the projection (FIGS. 1, 12) of a resilient protrusion 90, 108 into each cell bordering the plates 23, 24, 25, 26. As stated, plates 21 are orientated in parallel with paired plates 23, 25, (FIG. 1). The plates 21 on either side of the paired plates are disposed with face 33 directed toward the paired plates with which the plates 21 are in parallel. The faces 33 of plates 21 on one side of and directed toward the paired plates 23, 25 mirror faces 33 of plates 21 disposed on the opposite side of the paired plates. Hence, the rigid protrusion 71, 72 of each plate 21 projects toward paired plates 23, 25. Similarly, plates 22 are orientated in parallel with paired plates 24, 26 so that the rigid protrusions 71, 72 of each plate 22, on either side of paired plates 24, 26, projects toward the paired plates 24, 26. The faces 33 of plates 22 on one side of and directed toward the paired plates 24, 26 mirror the faces 33 of the plates 22 disposed on the opposite side of the paired plates. Hence, as is best seen in FIGS. 1 and 12, each cell 30 is bordered by two adjacent surfaces having only resilient protrusions opposed by two adjacent surfaces having only rigid protrusions.

The use of the paired plates 23, 25 and paired plates 24, 26, in the manner set forth above, allows reversal of the faces of the remaining plates on either side of the paired plates so that while maintaining mutually adjacent resilient protrusions opposite adjacent rigid protrusions projecting from the borders of each cell, only rigid protrusions are employed in the peripheral band 110. The resulting peripheral band has greater strength and is capable of withstanding higher impact loads. Furthermore, a spring like member 121 (FIG. 10) may be formed on the outsdie face 112 of the peripheral band 110. Since the member 121 is generally located between cutouts 115, it may be flexed. Location of band 110 in lateral alignment and in contact with the peripheral bands of juxtaposed fuel assemblies in the reactor core will compress the member 121 causing each band to bear against the adjacent band in tension and resulting in positive lateral support. Moreover, the member 121 (FIG. 10) can similarly bear in tension against the inner walls of a fuel assembly can to rigidly hold the assembly in position in a reactor utilizing cans to encircle the fuel assembly.

The fuel pins, are typically supported laterally by a plurality of spacer grids at intervals along their length.

Figure 12:
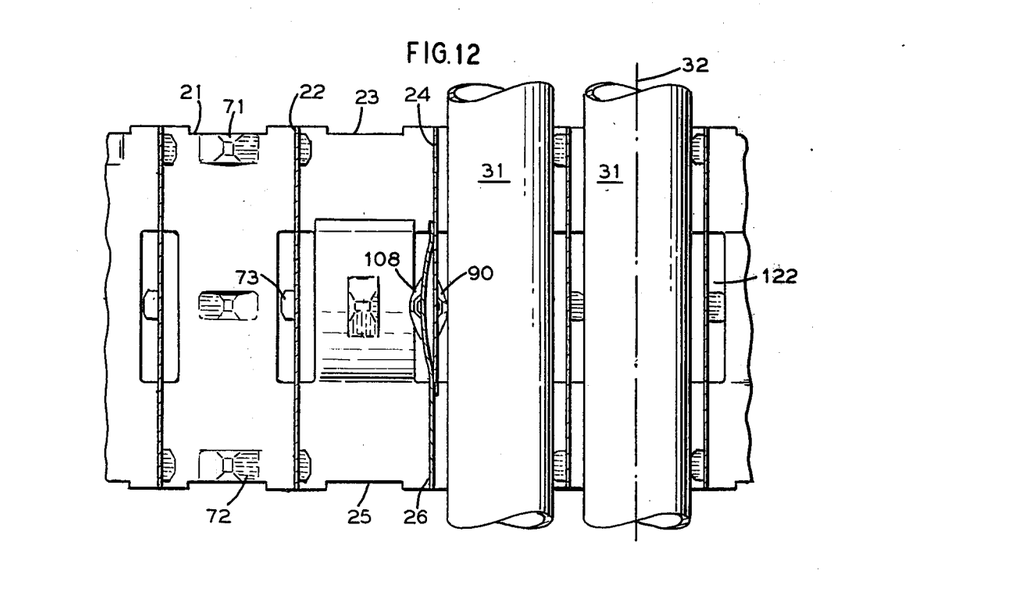
FIG. 12 is an offset sectional side view taken along line 12—12 of FIG. 1.

Referring now to FIG. 12, deflecting means (not shown), such as described in U.S. Pat. No. 3,665,586 issued to F. S. Jabsen on May 30, 1972, may be utilized to deflect the panels resilient protrusions projecting into a cell, to allow a fuel pin to be freely inserted. After the fuel pin 31 is positioned within the cell, the deflecting means is actuated to release the resilient protrusions thereby allowing the panels containing the resilient protrusions to bear against the fuel pin in tension and laterally jam the pin against the opposing rigid protrusions to support the fuel pin and retain it in position within the cell. The deflecting means can be inserted into the open channels 122 (FIG. 11) typically formed by the cooperation of the rectangular openings 54, 56, 86, 101, 103 of the grid plates.

The magnitude of the lateral forces imparted onto a fuel pin by the protrusions is designed to securely restrain the pin and to minimize fretting without overstressing the cladding at the points of contact.

From the foregoing, it can be easily understood that the described spacer grid assembly achieves the desired results of providing a grid lattice usable in either a "canless" or "can" type reactor core, having cells which utilize a combination of resilient and rigid protrusions in contact with the fuel pins, resulting in a substantially stronger outer band, and minimizing the amount of material capable of causing undesirable hydraulic pressure losses, parasitic absorption of neutrons and fuel pin hot spots at grid plate to pin contact points.

Except where qualified, the term "generally central", in the specification and the claims, includes a slight offset of the intersections of the paired plates from the center of the grid plate lattice so that an odd numbered array of cells could be formed, e.g., a 17×17 array, in addition to arrangements which would give even numbered arrays of cells.

I claim:

1. A nuclear reactor fuel assembly spacer grid for supporting and spacing a plurality of elongated fuel elements with their longitudinal axes in parallel comprising: at least two generally rectangular first plates, second plates, and a plurality of substantially flat rectangular third plates, each having lengthwise edges disposed transversely with respect to the longitudinal axes of the fuel elements and widthwise edges disposed generally parallel to the longitudinal axes of the fuel elements, and oppositely disposed faces bound perimetrically by said lengthwise and widthwise edges; a peripheral band circumscribing the spacer grid; said peripheral band having an inner face and an outer face; said lengthwise edges of said first and second plates transversely cut by slots each along a respective lengthwise edge thereof for mutually interlocking said first and second plates as a pair with said third plates; one of said first and one of said second plates being generally disposed in longitudinally spaced and inverted relation with respect to each other so that said slots on said respective first and second plates are oriented in opposite directions to form a first set of paired plates each having spaced cantilevered panels traversing the longitudinal space such that a portion of each panel is in transverse contact with the opposing plate of the pair; other first and second plates being relatively longidudinally spaced and inverted to form a second set of paired plates similar to said first set of paired plates; said first and second sets of paired plates being further disposed to perpendicularly intersect each other set and the third plates to mutually interlock therewith; said widthwise edges of the first, second, and third plates being in communication with the inner face of the peripheral band to form a plurality of cells having a substantially open cross-section through which the fuel elements protrude; a plurality of protrusions extending into the cells from one face of the first and second plates, from the inner face of the peripheral band, and from both faces of the third plates; said protrusions of the first and second plates being resilient; said protrusions of the inner face of the prripheral band being rigid; and said protrusions on one face of the third plate being rigid and the protrusions on the opposite face of the third plates being resilient.

2. A fuel assembly spacer grid according to claim 1 wherein a first plurality of said third plates is disposed parallel to and on either side of said first set of paired plates so that the rigid protrusions of the plates of said first plurality of third plates are orientated toward said first set of paired plates; a second plurality of third plates is disposed parallel to and on either side of said second set of paired plates so that the rigid protrusion of the plates of said second plurality of third plates are orientated toward said second set of paired plates; and said second plurality of third plates being inverted and perpendicularly disposed with respect to said first plurality of third plates.

3. A fuel assembly spacer grid according to claim 2 wherein said protrusions of said first, second, and third plates, of said peripheral band include at least one aperture.

4. A fuel assembly spacer grid according to claim 3 wherein said first, second, and third plates, and said peripheral band are disposed so that said cells each has two adjacent sides with resilient protrusions projecting into said cell opposite two adjacent sides with rigid protrusions projecting into said cell.

5. A spacer grid for supporting and spacing fuel elements comprising: a pair of slotted first plates generally disposed in longitudinally spaced and inverted relation having spaced cantilevered panels traversing said longitudinal space such that a portion of each panel is in transverse contact with the opposing plate of the pair; a pair of slotted second plates generally disposed in longitudinally spaced and inverted relation having spaced cantilevered panels traversing said longitudinal space such that a portion of each panel is in transverse contact with the opposing plate of the pair; a plurality of third plates; a peripheral band; said pair of slotted first plates and said pair of slotted second plates being disposed to perpendicularly intersect each other and said third plates to mutually interlock therewith; said peripheral band being in communication with said mutually interlocked plates to form a plurality of cells through which the fuel elements protrude.

6. A spacer grid as defined in claim 5 wherein said cantilevered panels of the first plates and the second plates include resilient protrusions projecting a portion of said panels; said third plates include a plurality of resilient protrusions projecting one face and rigid protrusions projecting the opposite face; said peripheral band includes rigid protrusions projecting the face of the cells side of the band; and said first, second and third plates being disposed so that each of said cells has two adjacent sides with resilient protrusions projecting into said cell opposite two adjacent sides with rigid protrusions projecting into said cells.

7. A spacer grid as defined in claim 6 wherein said peripheral band includes a spring like member formed on the face of the peripheral band opposite said cells.

8. A spacer grid as defined in claim 7 wherein said cantilevered panels are arcuate.

* * * * *

UNITED STATES PATENT AND TRADEMARK OFFICE
CERTIFICATE OF CORRECTION

PATENT NO. : 4,163,690
DATED : August 7, 1979
INVENTOR(S) : Felix S. Jabsen

It is certified that error appears in the above-identified patent and that said Letters Patent are hereby corrected as shown below:

Column 3, line 8, delete "it"

and insert --is--.

Column 9, line 23, delete "fixed"

and insert --flexed--

Column 10, line 16, delete "outsidie"

and insert --outside--

Signed and Sealed this

Twenty-fifth Day of December 1979

[SEAL]

Attest:

Attesting Officer

SIDNEY A. DIAMOND

Commissioner of Patents and Trademarks